(12) United States Patent
Takasu et al.

(10) Patent No.: US 11,727,667 B2
(45) Date of Patent: Aug. 15, 2023

(54) COMPUTER-READABLE STORAGE MEDIUM, IMAGE PROCESSING APPARATUS, AND METHOD FOR IMAGE PROCESSING

(71) Applicant: BROTHER KOGYO KABUSHIKI KAISHA, Nagoya (JP)

(72) Inventors: Masaya Takasu, Nagoya (JP); Chisato Inoue, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 16 days.

(21) Appl. No.: 17/516,094

(22) Filed: Nov. 1, 2021

(65) Prior Publication Data

US 2022/0180115 A1 Jun. 9, 2022

(30) Foreign Application Priority Data

Dec. 9, 2020 (JP) .................. 2020-204507

(51) Int. Cl.
*G06V 10/44* (2022.01)
*G06V 10/75* (2022.01)

(52) U.S. Cl.
CPC .......... *G06V 10/443* (2022.01); *G06V 10/757* (2022.01)

(58) Field of Classification Search
CPC ............................ G06V 10/443; G06V 10/757
See application file for complete search history.

(56) References Cited

U.S. PATENT DOCUMENTS

| 2011/0208477 | A1 | 8/2011 | Hitomi et al. | |
| 2013/0002828 | A1* | 1/2013 | Ding | G02B 17/0836 348/335 |
| 2015/0317821 | A1* | 11/2015 | Ding | G06T 7/11 345/420 |
| 2015/0348248 | A1* | 12/2015 | Shibata | G06T 5/003 382/260 |
| 2016/0012304 | A1* | 1/2016 | Mayle | G06V 20/647 382/209 |

(Continued)

FOREIGN PATENT DOCUMENTS

| JP | H06-083961 A | 3/1994 |
| JP | H11-063959 A | 3/1999 |

(Continued)

*Primary Examiner* — Syed Haider
(74) *Attorney, Agent, or Firm* — Baker Botts L.L.P.

(57) ABSTRACT

A non-transitory computer readable storage medium storing computer readable instructions executable by a computer is provided. The computer readable instructions cause the computer to obtain first image data composing a first image and second image data composing a second image; specify first edge pixels in the first image and second edge pixels in the second image using the first image data and the second image data, respectively; specify a first feature point and a second feature point corresponding to each other using an algorithm different from an algorithm to specify the first edge pixels and the second pixels; determine pixels located in vicinity to the first feature point and pixels located in vicinity to the second feature point as first usable pixels and second usable pixels, respectively; and using the first usable pixels and the second usable pixels, determine positional relation between the first image and the second image.

8 Claims, 7 Drawing Sheets

(56) References Cited

U.S. PATENT DOCUMENTS

2017/0148154 A1    5/2017    Nakao

FOREIGN PATENT DOCUMENTS

| | | |
|---|---|---|
| JP | 2006-113931 A | 4/2006 |
| JP | 2010-197336 A | 9/2010 |
| JP | 2012-009919 A | 1/2012 |
| JP | 2012-048593 A | 3/2012 |
| JP | 2013-114547 A | 6/2013 |
| JP | 2017-096750 A | 6/2017 |
| WO | 2010/052855 A1 | 5/2010 |

\* cited by examiner

COMPUTER-READABLE STORAGE MEDIUM, IMAGE PROCESSING APPARATUS, AND METHOD FOR IMAGE PROCESSING

CROSS REFERENCE TO RELATED APPLICATIONS

This application claims priority under 35 U.S.C. § 119 from Japanese Patent Application No. 2020-204507, filed on Dec. 9, 2020, the entire subject matter of which is incorporated herein by reference.

BACKGROUND

The present disclosure is related to a technique for determining positional relation between images.

An image processing apparatus capable of specifying an object, such as an electronic part, in an image being searched, is known. The image processing apparatus may match positions of the searched image and a template image roughly with reference to pixels extracted from edge pixels in the searched image with use of corner scores. The image processing apparatus may thereafter match final positions of the searched image and the template image with reference to the entire edge pixels in the searched image or with reference to some of the edge pixels extracted from the searched image.

SUMMARY

However, in the above known technique, how the edge pixels to be used for matching should be selected may not be considered sufficiently. Therefore, occasionally, the positional relation between the images may not be determined accurately.

The present disclosure is advantageous in that a technique for determining positional relation between images accurately is provided.

According to an aspect of the present disclosure, a non-transitory computer readable storage medium storing computer readable instructions that are executable by a computer, the computer readable instructions, when executed by the computer, causing the computer to obtain first image data composing a first image and second image data composing a second image, the second image corresponding to an object; specify a plurality of first edge pixels in the first image with use of the first image data and a plurality of second edge pixels in the second image with use of the second image data; specify a first feature point and a second feature point corresponding to each other, the first feature point being a point located in a part of the first image having a predetermined local feature, the second feature point being a point located in a part of the second image having the predetermined local feature, the first feature point and the second feature point being specified with use of an algorithm different from an algorithm to specify the plurality of first edge pixels and the plurality of second pixels, correspondence between the first feature point and the second feature point being determined based on comparison between a first local feature amount indicating a feature of a local region including the first feature point and a second local feature amount indicating a feature of a local region including the second feature point; determine pixels located in vicinity to the first feature point among the plurality of first edge pixels as first usable pixels and determine pixels located in vicinity to the second feature point among the plurality of second edge pixels as second usable pixels; and with use of the first usable pixels and the second usable pixels, determine positional relation between the first image and the second image.

According to another aspect of the present disclosure, an image processing apparatus, including a memory configured to store data and a controller, is provided. The controller is configured to obtain first image data composing a first image and second image data composing a second image, the second image corresponding to an object; specify a plurality of first edge pixels in the first image with use of the first image data and a plurality of second edge pixels in the second image with use of the second image data; specify a first feature point and a second feature point corresponding to each other, the first feature point being a point located in a part of the first image having a predetermined local feature, the second feature point being a point located in a part of the second image having the predetermined local feature, the first feature point and the second feature point being specified with use of an algorithm different from an algorithm to specify the plurality of first edge pixels and the plurality of second pixels, correspondence between the first feature point and the second feature point being determined based on comparison between a first local feature amount indicating a feature of a local region including the first feature point and a second local feature amount indicating a feature of a local region including the second feature point; determine pixels located in vicinity to the first feature point among the plurality of first edge pixels as first usable pixels and determine pixels located in vicinity to the second feature point among the plurality of second edge pixels as second usable pixels; and with use of the first usable pixels and the second usable pixels, determine positional relation between the first image and the second image.

According to another aspect of the present disclosure, a method to process images is provided. The method includes obtaining first image data composing a first image and second image data composing a second image, the second image corresponding to an object; specifying a plurality of first edge pixels in the first image with use of the first image data and a plurality of second edge pixels in the second image with use of the second image data; specifying a first feature point and a second feature point corresponding to each other, the first feature point being a point located in a part of the first image having a predetermined local feature, the second feature point being a point located in a part of the second image having the predetermined local feature, the first feature point and the second feature point being specified with use of an algorithm different from an algorithm to specify the plurality of first edge pixels and the plurality of second pixels, correspondence between the first feature point and the second feature point being determined based on comparison between a first local feature amount indicating a feature of a local region including the first feature point and a second local feature amount indicating a feature of a local region including the second feature point; determining pixels located in vicinity to the first feature point among the plurality of first edge pixels as first usable pixels and determine pixels located in vicinity to the second feature point among the plurality of second edge pixels as second usable pixels; and with use of the first usable pixels and the second usable pixels, determining positional relation between the first image and the second image.

DETAILED DESCRIPTION

In the following paragraphs, with reference to the accompanying drawings, an embodiment of the present disclosure will be described. It is noted that various connections may be set forth between elements in the following description. These connections in general and, unless specified otherwise, may be direct or indirect and that this specification is not intended to be limiting in this respect.

A. Embodiment

A-1. Configuration of the Printing System 1000

Figure 1:
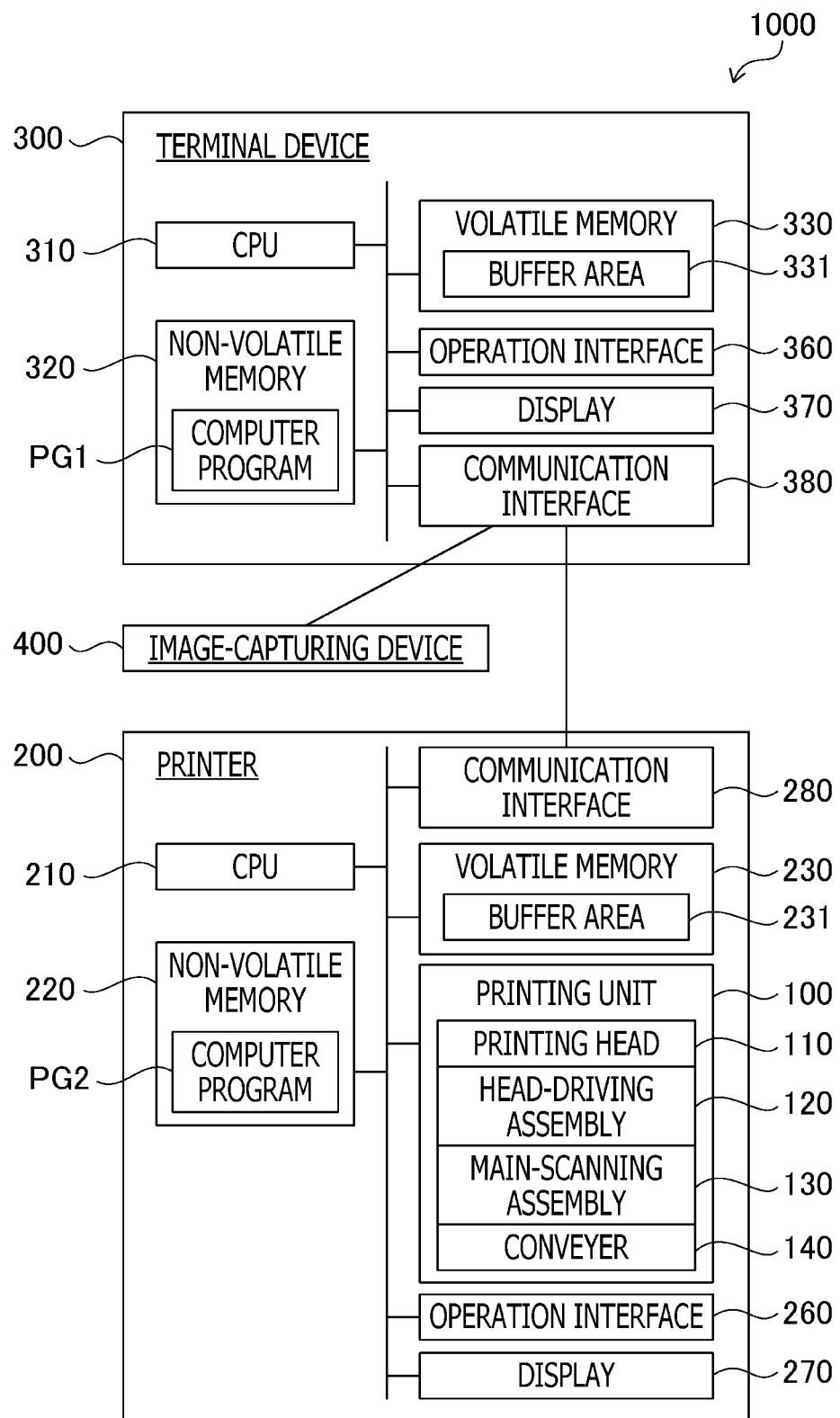
FIG. 1 is a block diagram to illustrate a configuration of a printing system 1000 according to an embodiment of the present disclosure.

The embodiment of the present disclosure will be described below. FIG. 1 is a block diagram to illustrate a configuration of the printing system 1000 according to the embodiment of the present disclosure. The printing system 1000 includes a printer 200, a terminal device 300, and an image-capturing device 400. The printer 200 and the terminal device 300 are connected to communicate with each other, and the image-capturing device 400 and the terminal device 300 are connected to communicate with each other.

The terminal device 300 is a computer, which may be used by a user of the printer 200, and may include, for example, a personal computer and a smart phone. The terminal device 300 has a CPU 310 being a controller of the terminal device 300, a non-volatile memory 320 such as a hard disk drive, a volatile memory 330 such as RAM, an operation interface 360 such as a mouse and a keyboard, a display 370 such as a liquid crystal display, and a communication interface 380. The communication interface 380 may include, for example, a wired and/or wireless interface, which enables communication with the printer 200 and the image-capturing device 400.

The volatile memory 330 has a buffer area 331 for temporarily storing various intermediate data generated when the CPU 310 processes data. The non-volatile memory 320 may store computer programs including a computer program PG1. The computer program PG1 may be provided by a manufacture of the printer 200 in a form of, for example, downloadable from a server or being stored in a medium such as, for example, a DVD-ROM. The CPU 310 executing the computer program PG1 may function as a printer driver to control the printer 200. The CPU 310 functioning as the printer driver may conduct, for example, a template registration process and a printing process, which will be described further below.

The image-capturing device 400 is a digital camera, which may optically capture an image of an object and generate image data to reproduce the image. In the following paragraphs, the generated image data of the captured image may be called as captured-image data. The image-capturing device 400 may generate and transmit the captured-image data to the terminal device 300 under control of the terminal device 300.

The printer 200 includes, for example, a printing unit 100, a CPU 210 being a controller of the printer 200, a non-volatile memory 220 such as a hard disk drive, a volatile memory 230 such as RAM, an operation interface 260 including buttons and a touch panel, through which the user's operation may be entered, a display 270 such as a liquid crystal display, and a communication interface 280. The communication interface 280 may include, for example, a wired and/or wireless interface, which enables communication with the terminal device 300.

The volatile memory 230 has a buffer area 231 for temporarily storing various intermediate data generated when the CPU 210 processes data. The non-volatile memory 220 may store computer programs including a computer program PG2. The computer program PG2 in the present embodiment is a controlling program to control the printer 200 and may be installed in the non-volatile memory 220 before being shipped to be delivered to the user. However, optionally, the computer program PG 2 may be provided in a form downloadable from a server or being stored in a medium such as, for example, a DVD-ROM. The CPU 210 executing the computer program PG2 may control the printing unit 100 in accordance with printable data, which may be, for example, transmitted from the terminal device 300 in the printing process described below, to print an image on a printable medium. The printer 200 in the present embodiment may use a piece of fabric as the printable medium and may print an image on, for example, a garment such as a T-shirt and a shoe SH (see FIG. 2).

The printing unit 100 may be an inkjet-printing apparatus, which prints an image by discharging droplets of inks in multiple colors such as cyan (C), magenta (M), yellow (Y), and black (K). The printing unit 100 includes a printing head 110, a head driving assembly 120, a main-scanning assembly 130, and a conveyer 140.

Figure 2:
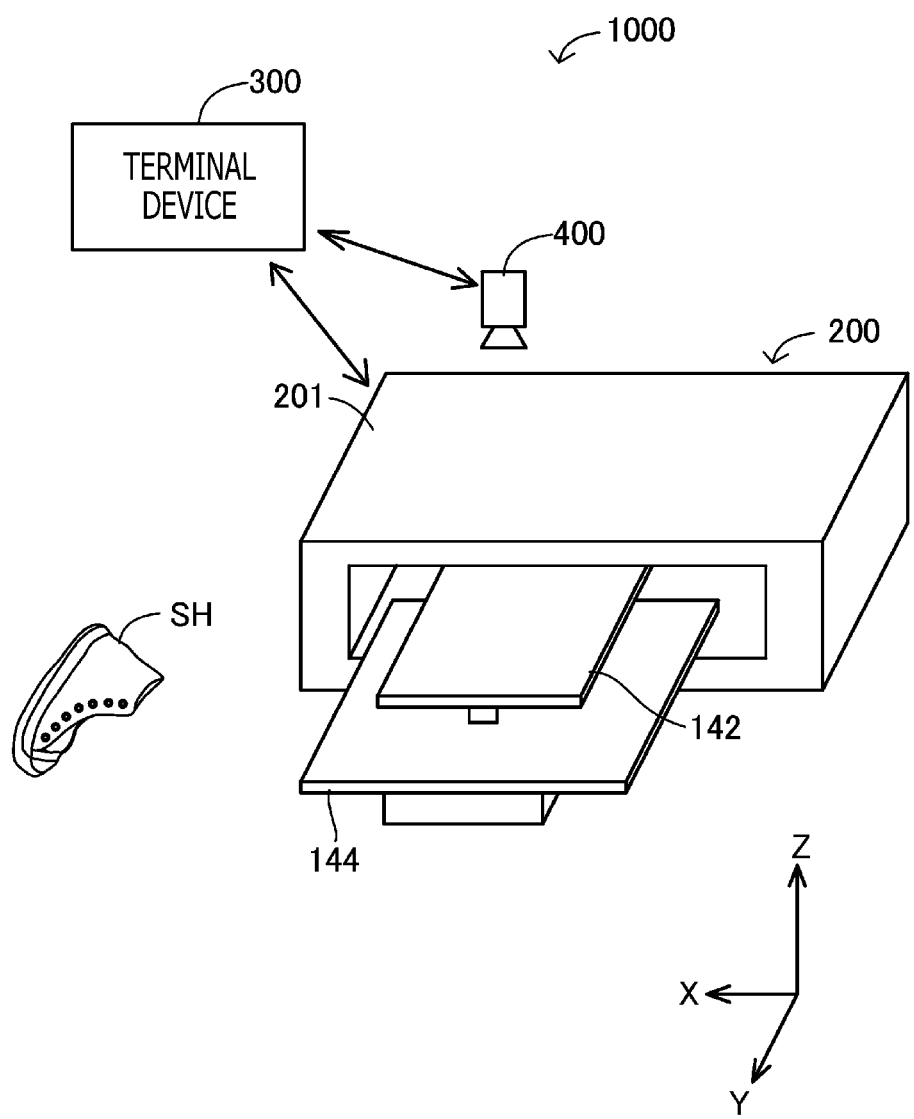
FIG. 2 is an overall illustrative view of the printing system 1000 according to the embodiment of the present disclosure.

The printing system 1000 will be described further with reference to FIG. 2. FIG. 2 is an overall illustrative view of the printing system 1000 according to the embodiment of the present disclosure. A leftward direction, a rightward direction, a frontward direction, a rearward direction, an upward direction, and a downward direction of the printer 200 may be called as +X-direction, −X-direction, +Y-direction, −Y-direction, +Z-direction, and −Z-direction, respectively, as indicated by three-dimensioned arrows in FIG. 2.

The main-scanning assembly 130 may move a carriage (not shown), on which the printing head 110 is mounted, to reciprocate inside the housing 201 in a main-scanning direction, e.g., the X-direction in FIG. 2, by use of a main-scanning motor (not shown). Thereby, a main-scanning operation, in which the printing head 110 reciprocates along the main-scanning direction, i.e., the X-direction, over the printable medium such as the shoe SH, may be performed.

The conveyer 140 includes a platen 142 and a tray 144, which are arranged in a central area in the X-direction in the housing 201. The platen 142 is in a form of a plate and has an upper surface, which is a surface in the +Z-direction, may serve as a loadable surface, on which the printable medium such as the shoe SH may be placed. The platen 142 is fixed to the tray 144, which has a form of a plate and is located on a side in the −Z-direction with respect to the platen 142. The tray 144 is substantially larger than the platen 142. The printable medium such as the shoe SH may be retained by the platen 142 and the tray 144. For example, when the printable medium is the shoe SH, a tool (not shown) fixed to the platen 142 may be inserted in a cavity inside the shoe SH, in which a foot of a wearer may fit, to hold the shoe SH on the tool. The platen 142 and the tray 144 may be conveyed in a conveying direction, e.g., the Y-direction in FIG. 2, which intersects with the main-scanning direction, by a driving force from a sub-scanning motor (not shown). Thereby, a sub-scanning operation, in which the printable medium such as the shoe SH may be conveyed in the conveying direction with respect to the printing head 110, may be performed.

The head driving assembly 120 (see FIG. 1) may, while the main-scanning assembly 130 performs the main-scanning operation, supply driving signals to the printing head 110 to drive the printing head 110. The printing head 110 includes a plurality of nozzles (not shown) and may discharge the ink droplets in accordance with the driving signals at the printable medium, which is being conveyed in the conveying direction by the conveyer 140, to form dots on the printable medium.

The image-capturing device 400 as shown in FIG. 2 is supported by a supporting tool (not shown) and is arranged on a side of the printer 200 in the +Z-direction. The image-capturing device 400 may be located at a position apart from the printer 200 and is arranged to face the upper surface of the platen 142 to capture an image of the printable medium such as the shoe SH placed on the upper surface of the platen 142. Thereby, the image-capturing device 400 may generate the captured-image data composing the image of the printable medium such as the shoe SH.

A-2. Actions in Printing System 1000

Actions performable in the printing system 1000 will be described below. The printing system 1000 may print a predetermined image, e.g., pattern, logo, etc., in a printable area being a part of the printable medium, e.g., the shoe SH. The printable area in the present embodiment is an area on a piece of fabric forming a lateral face of the shoe SH. The shoe SH may be, for example, placed on a predetermined position with respect to the platen 142 and the tray 144 by a worker. However, it may be difficult for the worker to locate the shoe SH at an exact same position on the platen 142 each time as the worker handles a plurality of shoes SH one after another. In this regard, the printing system 1000 provides a function to specify an area including the shoe SH on the platen 142 and the tray 144 as the printable area, and to print the image on the specified printable area on the shoe SH.

A-2-1. Template Registration Process

A template registration process is a process to generate template image data to be used in the printing process for specifying the printable area, in which the shoe SH is located, with use of a sample shoe SH. The printing process will be described further below. The sample shoe SH may be, for example, one of a plurality of shoes SH for the workers to print the image thereon.

Figure 3A:
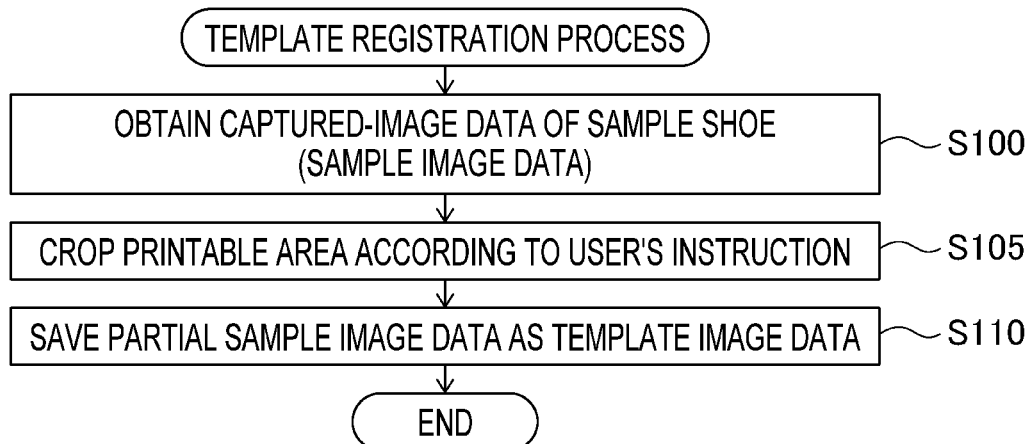
FIG. 3A is a flowchart to illustrate a flow of steps in a template registration process to be conducted in the printing system 1000 according to the embodiment of the present disclosure.

FIG. 3A is a flowchart to illustrate a flow of steps in the template registration process to be conducted in the printing system 1000. The template registration process may start, for example, while the sample shoe SH is set on the platen 142 and the image-capturing device 400 is ready to capture an image of the shoe SH on the platen 142 from above, and when the user inputs a start command in the terminal device 300. The template registration process may be conducted by the CPU 310 of the terminal device 300.

In S100, the CPU 310 obtains captured-image data of the sample shoe SH from the image-capturing device 400. In particular, the CPU 310 may transmit an image-capturing command to the image-capturing device 400. The image-capturing device 400 may capture the image of the sample shoe SH set on the platen 142, generate captured-image data composing the captured image, and transmit the generated captured-image data to the terminal device 300. The captured-image data may be, for example, a unit of image data including RGB values, each of which corresponds to one of a plurality of pixels and indicates a color of the pixel, composing the captured image. The RGB value is a value of a color in an RGB-color system containing three component values of R, G, and B. The captured-image data composing the image of the sample shoe SH obtained in S100 may be hereinafter called as sample image data, and the image composed of the sample image data may be called as a sample image.

Figure 4B:
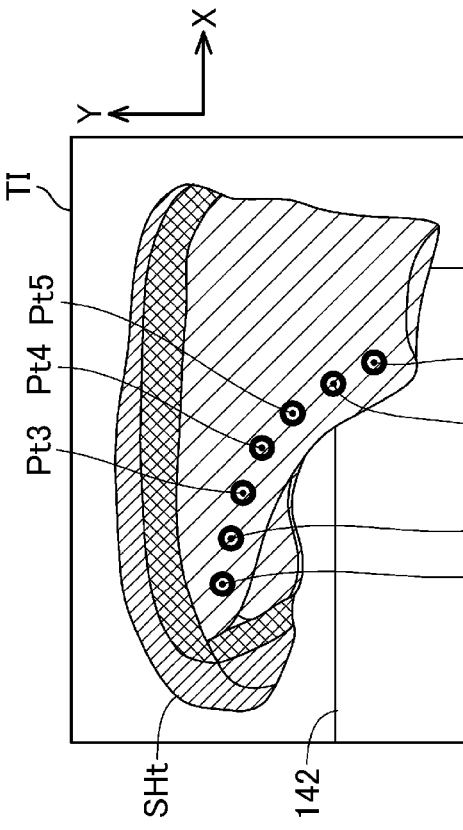
FIGS. 4A-4D are illustrative views of images related to a template image according to the embodiment of the present disclosure.
Figure 4A:
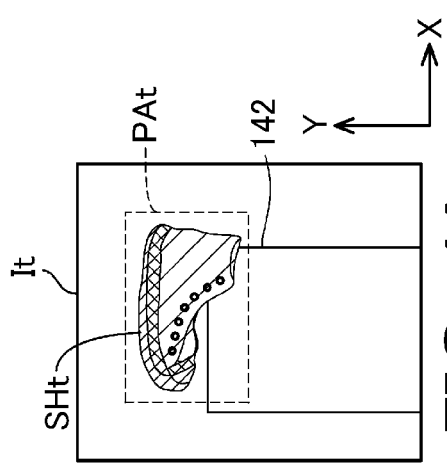

FIGS. 4A-4D illustrate images related to a template image according to the embodiment of the present disclosure. As shown in FIGS. 4A-4D, a left-right direction of each image corresponds to the main-scanning direction of the printer 200 (i.e., the X direction in FIG. 2), and an up-down direction of the image corresponds to the conveying direction of the printer 200 (i.e., the Y direction in FIG. 2). FIG. 4A shows an example of a sample image It as composed of the sample image data. The sample image It includes an image representing the sample shoe SH placed on the platen 142. In the following paragraphs, the image representing the sample shoe SH included in the sample image It may be called as "shoe SHt."

In S105, the CPU 310 crops a printable area PAt from the sample image It based on an instruction by the user. For example, the CPU 310 may display a user interface (UI) screen (not shown) through the display 370. The user may enter an instruction to designate the printable area PAt in the sample image It on the UI screen through a pointing device such as a mouse. The example in FIG. 4A shows the printable area PAt containing the shoe SHt. The CPU 310 conducts a cropping process to the sample image data and generates partial sample image data corresponding to the printable area PAt.

In S110, the CPU 310 saves the partial sample image data in the non-volatile memory 220 as template image data. FIG. 4B shows an example of a template image TI as composed of the template image data, i.e., the partial sample image data.

A-2-2. Printing Process

Figure 3B:
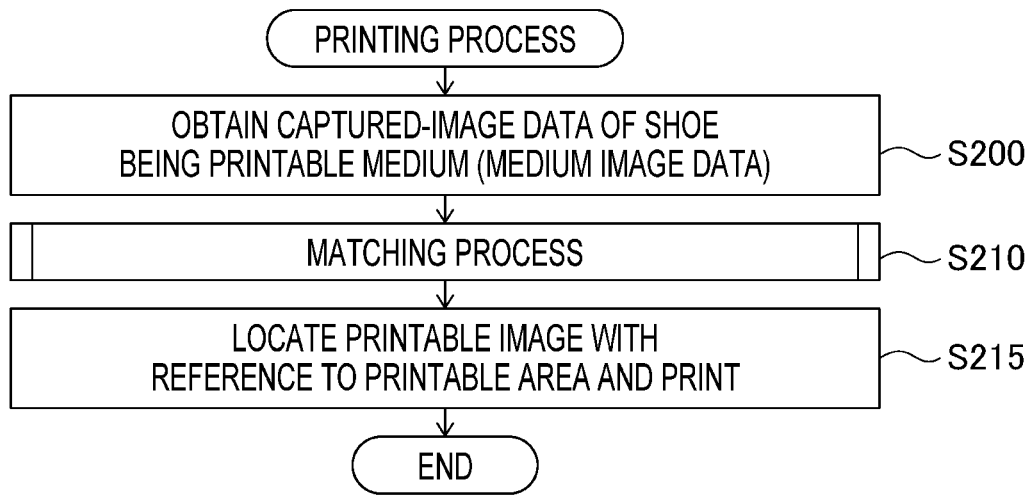
FIG. 3B is a flowchart to illustrate a flow of steps in a printing process to be conducted in the printing system 1000 according to the embodiment of the present disclosure.

The printing process is a process, in which a predetermined image, e.g., pattern, logo, etc., is printed in the printable area which includes the shoe SH as the printable medium. FIG. 3B is a flowchart to illustrate a flow of steps in the printing process. The printing process may start, while the shoe SH as the printable medium is set on the platen 42 and the image-capturing device 400 is ready to capture an image of the shoe SH on the platen 142 from above, when the user inputs a start command in the terminal device 300. The printing process may be conducted by the CPU 310 of the terminal device 300.

In S200, the CPU 310 obtains captured-image data of the shoe SH as the printable medium from the image-capturing device 400. The captured-image data may be obtained in the same manner as the captured-image data of the sample shoe SH obtained in S100 in FIG. 3A. In the following paragraphs, the captured-image data composing the image of the shoe SH as the printable medium obtained in S200 may be called as medium image data, and the image composed of the medium image data may be called as a medium image.

Figure 5A:
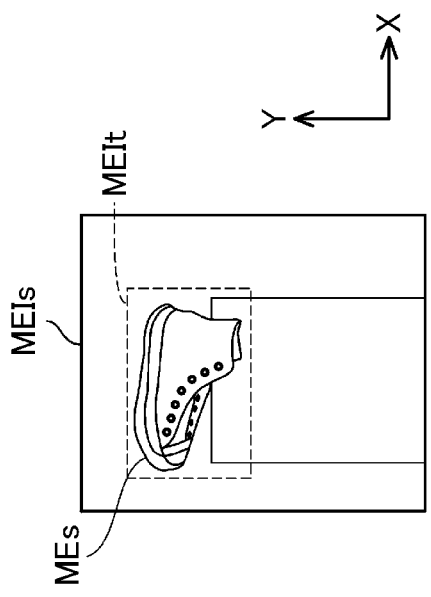
FIGS. 5A-5D are illustrative views of images related to a medium image according to the embodiment of the present disclosure.

FIGS. 5A-5D illustrate images related to the medium image according to the embodiment of the present disclosure. FIG. 5A shows an example of a medium image Is as composed of the medium image data. The medium image Is includes an image representing the shoe SH set on the platen 142, similarly to the sample image It. In the following paragraphs, the image representing the shoe SH included in the medium image Is may be called as "shoe SHs."

In S210, the CPU 310 conducts a matching process and specifies a printable area PAs in the medium image Is. The matching process may be conducted with use of the medium image data and the template image data. The matching process is a process, in which positional relation between the medium image Is and the template image TI is determined. The matching process will be described further below.

The positional relation between the medium image Is and the template image TI may be indicated by, for example, a position (coordinates) of the template image TI with respect to the medium image Is and inclination (angle) of the template image TI with respect to the medium image Is. The positional relation may further include largeness (scale) of the template image TI with respect to the medium image Is. In FIG. 5A, a rectangle drawn in a broken line represents an area of the template image TI arranged over the medium image Is according to the positional relation specified in the matching process. The CPU 310 specifies the printable area PAs based on the specified positional relation. For example, the area of the template image TI arranged over the medium image Is according to the specified positional relation may be specified as the printable area PAs (see FIG. 5A).

In S215, the CPU determines a position of the printable image, e.g., pattern, logo, etc., with respect to the specified printable area PAs and prints the image therein. For example, the CPU 310 may generate printable data, which may cause the printable image to be printed in a part of the shoe SH, e.g., an area on the lateral face of the shoe SH, in the printable area PAs specified in the medium image Is, and transmit the generated printable data to the printer 200. The printer 200 controls the printing unit 100 in accordance with the received printable data to print the image on the shoe SH.

A-2-3. Matching Process

Figure 6:
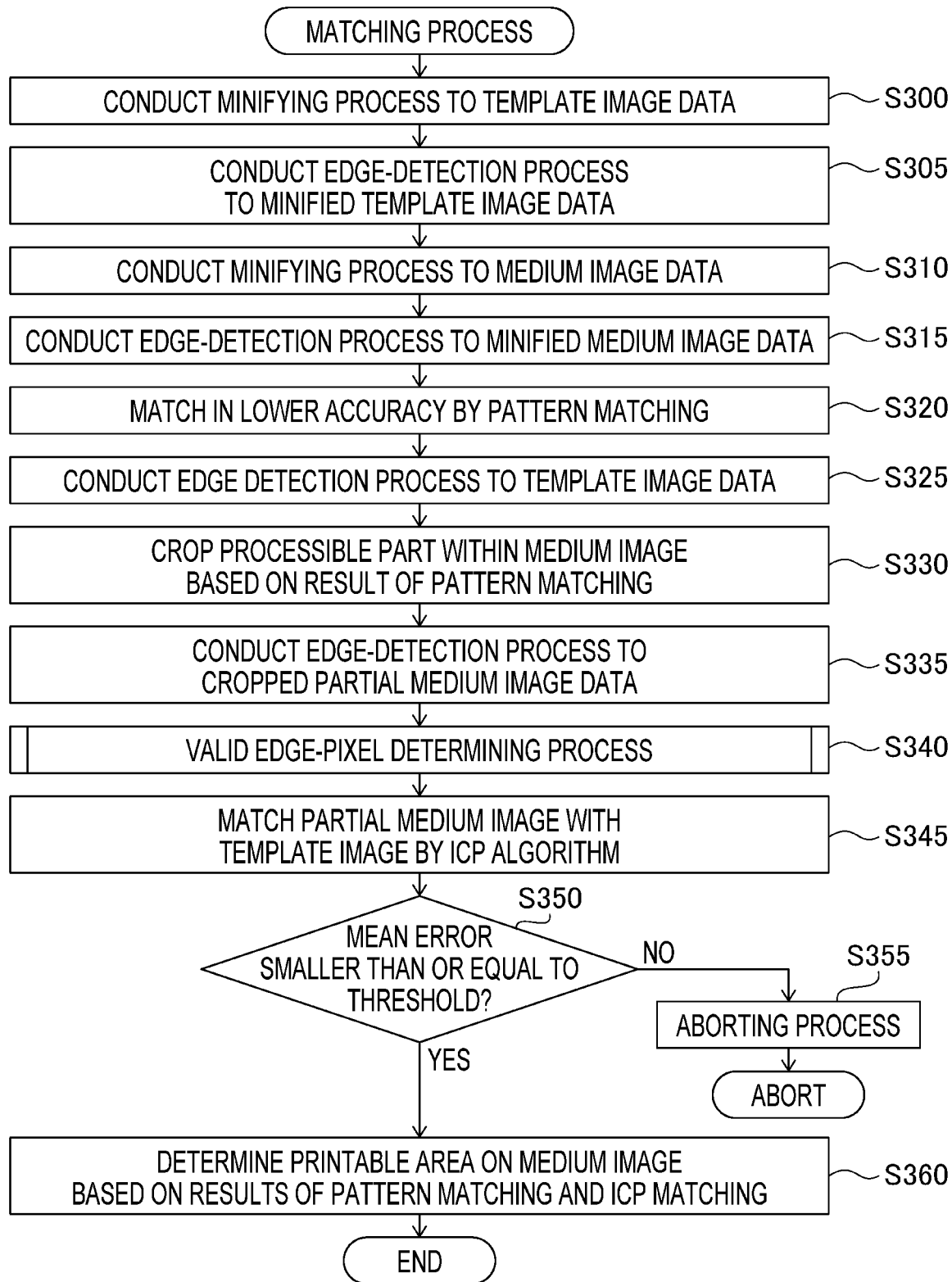
FIG. 6 is a flowchart to illustrate a flow of steps in a matching process to be conducted in the printing system 1000 according to the embodiment of the present disclosure.

The matching process in S210 in FIG. 3B will be herein described with reference to FIG. 6. FIG. 6 is a flowchart to illustrate a flow of steps in the matching process. In S300, the CPU 310 conducts a minifying process to the template image data to generate minified template image data. The minifying process is a process to reduce a number of pixels in the X-direction and a number of pixels in the Y-direction in a subject image at a predetermined minifying ratio. The minifying process may be conducted with use of a known method such as, for example, the nearest neighbor method, the bilinear method, and the bicubic method. The predetermined minifying ratio may be, for example, 10-50%.

In S305, the CPU 310 conducts an edged-detection process to the minified template image data to generate minified template edge data. The edge-detection process is a process to detect edge pixels in a plurality of pixels in the subject image and generate edge data describing the detected result. The edge data is a binary image data indicating each pixel is either an edge pixel or a non-edge pixel.

The edge pixels may be detected by various methods. The present embodiment uses the Canny Edge method, which may be preferred for detecting edge pixels that form contours of objects in an image. Optionally, for another example, a Laplacian filter or a Sobel filter may be used to calculate edge intensity, and pixels, of which edge intensity is greater than a threshold TH1, may be detected as edge pixels.

Figure 4D:
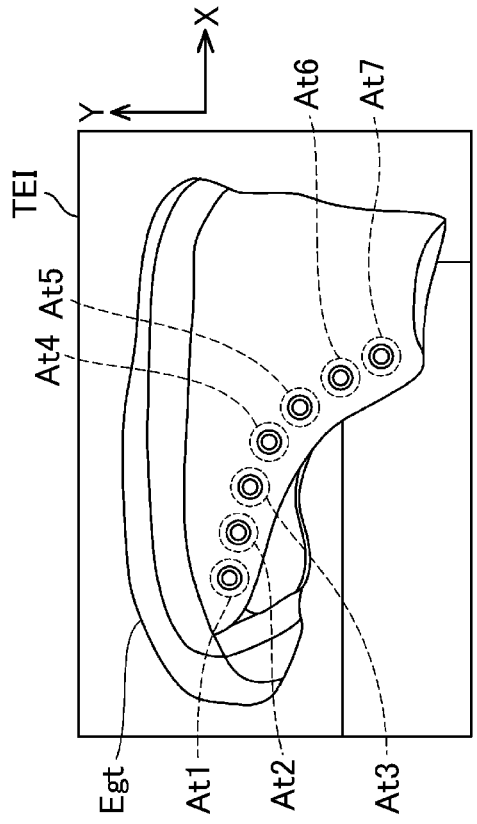
Figure 4C:
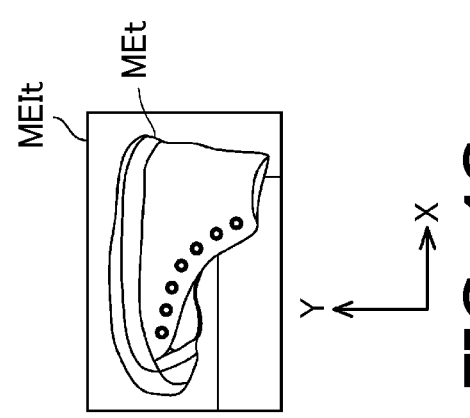

FIG. 4C shows a minified template edge image MEIt as composed of the minified template edge data. The minified template edge image MEIt includes edges MEt of the shoe SHt in the template image TI in FIG. 4B.

In S310, the CPU 310 conducts the minifying process to the medium image data to generate minified medium image data. The minifying process in S310 is conducted in the same manner as the minifying process to the template image data in S300, and the minifying ratio in the minifying process in S310 is the same minifying ratio as the minifying process in S300.

In S315, the CPU 310 conducts the edge-detection process to the minified medium image data to generate minified medium edge data. The edge-detection process in S315 uses the same method as the edge-detection process in S305.

Figure 5B:
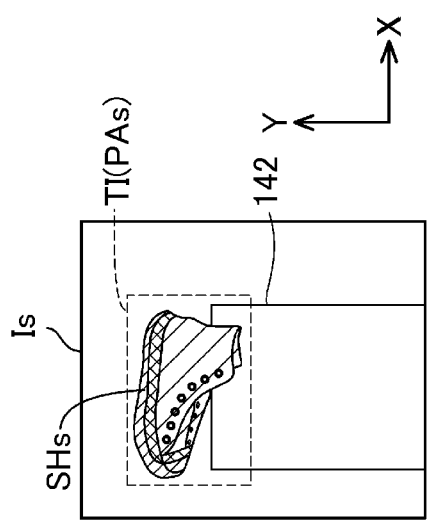

FIG. 5B shows a minified medium edge image MEIs as composed of the minified medium edge data. The minified medium edge image MEIs includes edges MEs of the shoe SHs in the medium image Is shown in FIG. 5A.

In S320, the CPU 310 conducts matching in a lower degree of accuracy with use of pattern matching. In particular, the CPU 310 may roughly determine positional relation between the minified medium edge image MEIs and the minified template edge image MEIt with use of the minified medium edge data and the minified template edge data. For the pattern matching, known algorithms may be used. The pattern matching may be, for example, a method to search for most-matched positional relation between the minified medium edge image MEIs and the minified template edge image MEIt, in which a degree of similarity between the minified medium edge image MEIs and the minified template edge image MEIt is highest, by changing the positional relation (coordinates and angles) between the minified medium edge image MEIs and the minified template edge image MEIt by a predetermined increment, and in an area where the minified medium edge image MEIs and the minified template edge image MEIt overlap, by calculating the degree of similarity between the minified medium edge image MEIs and the minified template edge image MEIt. The degree of similarity between the minified medium edge image MEIs and the minified template edge image MEIt may be determined, for example, based on a number of edge pixels in the minified medium edge image MEIs that overlap the edge pixels in the minified template edge image MEIt.

The degree of accuracy for matching may depend on the amount of increment. In S320, for example, the increment in the coordinates may be set within a range between 1 pixel and a few pixels, and the increment in the angle may be set within a range between 3 degrees and 7 degrees.

In FIG. 5B, a rectangle drawn in a broken line represents the minified template edge image MEIt arranged over the minified medium edge image MEIs within the positional relation determined through the pattern matching.

In S325, the CPU 310 conducts the edge-detection process to the template image data, which is original and not minified, to generate template edge data. The edge-detection process may use, for example, the Canny Edge method, similarly to the edge-detection process in S305. Optionally, for another example, a method with use of various detecting filters may be used.

FIG. 4D illustrates a template edge image TEI as composed of the template edge data. In the template edge image TEI, edge pixels Egt contained in the template image TI (see FIG. 4B) are specified.

In S330, based on the result of the pattern matching performed in S320 using the minified medium edge image MEIs and the minified template edge image MEIt, the CPU 310 crops a part of the medium image Is before being minified as a subject to be processed. In particular, the CPU 310 specifies positional relation between the medium image Is and the template image TI, which are not minified, based on the positional relation between the minified medium edge image MEIs and the minified template edge image MEIt specified in S320. The CPU 310 crops an area in the medium image Is that overlaps the template image TI in the specified positional relation and generates partial medium image data.

Figure 5C:
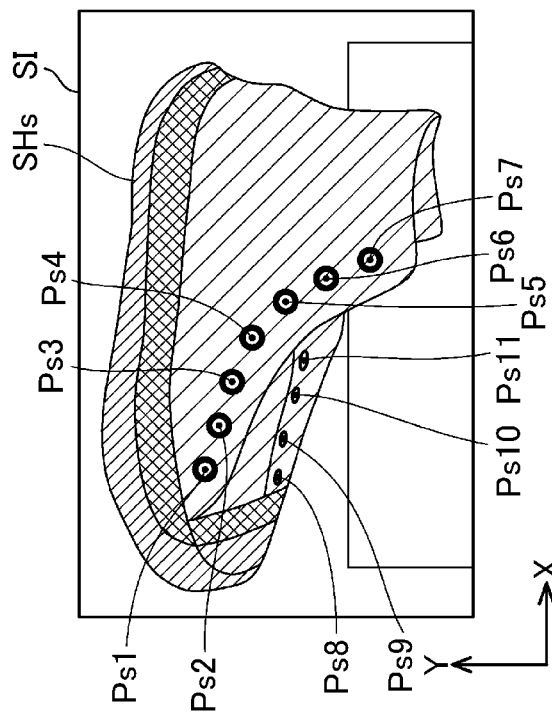

FIG. 5C illustrates a partial medium image SI as composed of the partial medium image data generated by cropping the area in the medium image Is in S330. The partial medium image SI in FIG. 5C is a part of the medium image Is that includes the shoe SHs.

In S335, the CPU 310 conducts the edge-detection process to the partial medium image data generated by the cropping in S330. The edge-detection process may use, for example, the Canny Edge method, similarly to the edge-detection process in S305. However, optionally, for another example, a method with use of various detecting filters may be used.

Figure 5D:
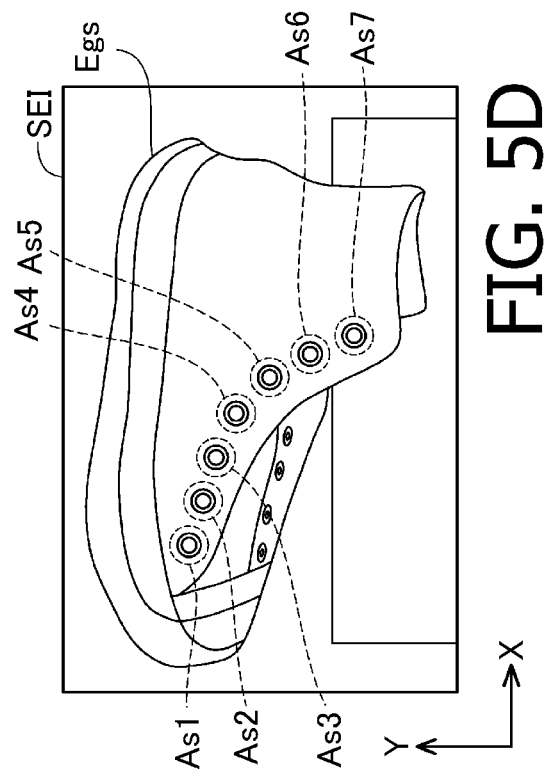

FIG. 5D illustrates a partial medium edge image SEI as composed of the partial medium edge data. In the partial medium edge image SEI, the edge pixels Egs contained in the partial medium image SI (see FIG. 5C) are specified.

In S340, the CPU 310 conducts a valid edge-pixel determining process. The valid edge-pixel determining process is a process to determine valid edge pixels, which are edge pixels to be used in final matching in S345 among the edge pixels Egt in the template image TI having been specified through the template edge image TEI and the edge pixels Egs in the partial medium image SI having been specified through the partial medium edge image SEI.

Figure 7:
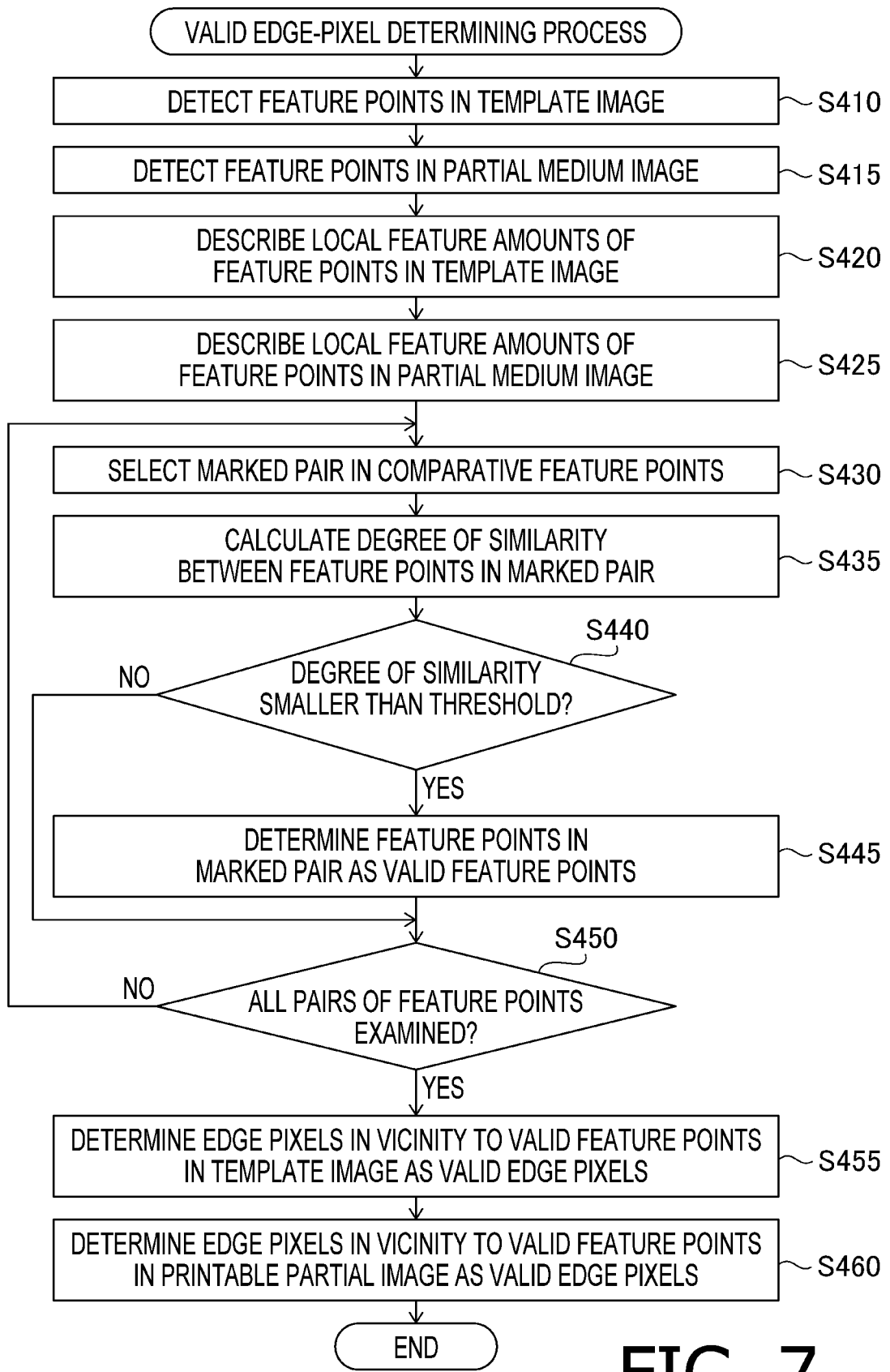
FIG. 7 is a flowchart to illustrate a flow of steps in a valid edge-pixel determining process to be conducted in the printing system 1000 according to the embodiment of the present disclosure.

FIG. 7 is a flowchart to illustrate a flow of steps in the valid edge-pixel determining process. In S410, the CPU 310 detects a plurality of feature points in the template image TI with use of the template image data. A feature point is a point located in a part of the image, having a predetermined local feature. Various algorithms may be used to detect the feature points. In the present embodiment, the CPU 310 may detect a local feature region with use of an algorithm called Maximally Stable Extremal Regions (MSER), which is a region detecting algorithm, and detect a pint representing the feature region as a feature point. For the point representing the feature region, for example, a center of gravity or a center of a bounding rectangle may be used. Thus, the feature points are specified with use of a different algorithm from the algorithm to detect the edge pixels Egt, Egs. In the example of FIG. 4B, feature points Pt1-Pt7 are detected in the template image TI. In images in practical use, however, a larger number of feature points may be detected.

In S415, the CPU 310 detects a plurality of feature points in the partial medium image SI with use of the partial medium image data. The method for detecting the feature points in S415 is the same as the method for detecting the feature points in the template image TI in S410. In the example of FIG. 5C, the feature points Ps1-Ps11 are detected in the partial medium image SI. In images in practical use, however, a larger number of feature points may be detected.

In S420, the CPU 310 describes a local feature amount for each of the feature points Pt1-Pt7 in the template image TI having been detected in S410. The local feature amount indicates a feature of the local region that includes the feature point. Various algorithms may be used to describe the local feature amounts. In the present embodiment, the CPU 310 uses an algorithm called Binary Robust Invariant Scalable Keypoints (BRISK) to describe the local feature amounts. The local feature amounts may be represented in, for example, a binary vector of a predetermined number of bits (e.g., 512 bits).

In S425, the CPU 310 describes a local feature amount for each of the feature points Ps1-Ps11 in the partial medium image SI having been detected in S415. The algorithm to describe the local feature amounts is the same as the algorithm used to describe the local feature amounts for the feature points in the template image TI in S420.

In S430, the CPU 310 selects a pair of feature points, having one of the feature points Pt1-Pt7 from the template image TI and one of the feature points Ps1-Ps11 from the partial medium image SI, as a marked pair.

In S435, the CPU 310 calculates a degree of similarity Svt of the two feature points that makes the pair of feature points. The degree of similarity Svt of the paired feature points may be based on, for example, a distance between the local feature amounts of the paired feature points. For the distance between the local feature amounts, for example, Hamming distance or Euclidean distance between vectors indicating the local feature amounts may be used. Therefore, the smaller the degree of similarity Svt, i.e., a shorter distance, between the paired feature points is, the more similar the paired feature points are.

In S440, the CPU 310 determines whether the degree of similarity Svt between the paired feature points is smaller than a predetermined threshold TH. If the degree of similarity Svt between the paired feature points is smaller than the predetermined threshold TH (S440: YES), in S445, the CPU 310 determines the feature points making the marked pair as valid feature points. If the degree of similarity Svt between the feature points is greater than or equal to the predetermined threshold (S440: NO), the CPU 310 skips S445.

In S450, the CPU 310 determines whether the entire pairs, each having one of the feature points in the template image TI and one of the feature points in the partial medium image SI, are examined as marked pairs. If one or more unexamined pairs remains (S450: NO), the CPU 310 returns to S430 and selects one of the unexamined pairs as a new marked pair. If all of the pairs have been examined (S450: YES), the CPU 310 proceeds to S455.

Through S430-S450 in FIG. 7, matching between the feature points Pt1-Pt7 in the template image TI and the feature points Ps1-Ps11 in the partial medium image SI is performed. Thereby, among the feature points Pt1-Pt7 in the template image TI, the points to which the corresponding feature points exist in the partial medium image SI are determined as valid feature points. Moreover, among the feature points Ps1-Ps11 in the partial medium image SI, the points to which the corresponding feature points exist in the template image TI are determined as valid feature points.

Between the example of FIGS. 4B and 5C, the feature points Pt1-Pt7 in the template image TI correspond to the feature points Ps1-Ps7 in the partial medium image SI, respectively. Therefore, the feature points Pt1-Pt7 in the template image TI and the feature points Ps1-Ps7 in the partial medium image SI are determined as the valid feature points. Meanwhile, the feature points Ps8-Ps11 in the partial medium image SI do not correspond to any of the feature points in the template image IT. Therefore, the feature points Ps8-Ps11 in the partial medium image SI are not determined as valid feature points. Thus, some of the feature points in one of the template image TI and the partial medium image SI may not have corresponding feature points in the other of the template image TI and the partial medium image SI, for example, in a reason that some of the feature points appearing in one of the template image TI and the partial medium image SI may not appear in the other of the template image TI and the partial medium image SI due to change in postures of the shoes SH and/or deformation of the shoes SH.

In S455, the CPU 310 determines, among the edge pixels Egt (see FIG. 4D) in the template image TI having been specified through the template edge image TEI, the edge pixels located in vicinity to the valid feature points in the template image TI as valid edge pixels. For example, the CPU 310 may determine that an edge pixel located within a predetermined distance from a valid feature point is an edge pixel located in vicinity to a valid edge pixel. In the example of FIG. 4D, the edge pixels Egt in circles At1-At7 drawn in broken lines are determined as the valid edge pixels.

In S460, the CPU 310 determines, among the edge pixels Egs (see FIG. 5D) in the partial medium image SI having been specified through the partial medium edge image SEI, the edge pixels located in vicinity to the valid feature points in the partial medium image SI as valid edge pixels. In the example of FIG. 5D, the edge pixels Egs in circles As1-As7 drawn in broken lines are determined as the valid edge pixels.

After completing the valid edge-pixel determining process, in S345 (see FIG. 6), the CPU 310 conducts matching between the partial medium image SI and the template image TI with use of Iterative Closest Point (ICP) algorithm. In particular, the matching is conducted based on usable pixels, which are the valid edge pixels in the template image TI and the valid edge pixels in the partial medium image SI. The matching may be conducted in accordance with the ICP algorithm by optimization calculation to minimize a distance between each edge pixel in the template image TI and each edge pixel the partial medium image SI.

The matching in S345 is conducted based on an initial position, which is the positional relation determined in the pattern matching in S320 in FIG. 6, in a higher degree of accuracy than the degree of accuracy in the pattern matching in S320 in FIG. 6. For example, the matching in S345 may be performed in a degree of accuracy, in which allowance in the coordinate (offset) is less than one pixel and allowance of the angle is smaller than one degree.

In S350, the CPU 310 determines whether a mean error of the matching in S345 is less than or equal to the threshold THm. The mean error is an average of the distances between the corresponding edge pixels in the partial medium image SI and the template image TI within the positional relation after the matching. When the mean error is less than or equal to the threshold THm, the CPU 310 determines that the matching in S345 was conducted in a substantially high degree of accuracy.

If the mean error is less than or equal to the threshold THm (S350: YES), in S360, the CPU 310 determines the printable area PAs (see FIG. 5A) in the medium image Is based on the result of the pattern matching in S320 and the result of the ICP matching in S345. In particular, the CPU 310 may specify final positional relation between the medium image Is and the template image TI based on the sum of the offset amounts and the sum of the rotation angles after the matching conducted twice, in S320 and S345. The CPU 310 determines an area in the medium image Is where the template image TI overlaps to be the printable area PAs.

If the mean error is greater than the threshold THm (S350: NO), in S355, the CPU 310 conducts an aborting process to abort the matching process. The aborting process may include, for example, a process to display a message informing the worker that the process is to be aborted and a message instructing the worker to restart the operation from the point where the shoe SH is set once again on the platen 142 through the display 370.

According to the embodiment described above, the CPU 310 may specify the edge pixels Egs (see FIG. 5D) in the medium image Is based on the medium image data (S335 in FIG. 6). The CPU 310 may specify the edge pixels Egt (see FIG. 4D) in the template image TI based on the template image data (S325 in FIG. 6). The CPU 310 may specify the feature points Ps1-Ps7 (see FIG. 5C) in the partial medium image SI and the feature points Pt1-Pt7 (see FIG. 4B) in the template image TI, which are in correspondence with each other, based on the medium image data and the template image data. As described above, the correspondence between the feature points in the partial medium image SI and the template image TI may be determined by comparing the local feature amounts of the paired feature points (S430-S445 in FIG. 7). The CPU 310 may determine the pixels located in vicinity to the feature points Ps1-Ps7 among the edge pixels Egs in the partial medium image SI (S460 in FIG. 7) as the usable pixels to be used in the matching in S345 in FIG. 6 and the pixels located in vicinity to the feature points Pt1-Pt7 among the edge pixels Egt in the template image TI (S455 in FIG. 7) as the usable pixels to be used in the matching in S345. The CPU 310 may determine positional relation between the partial medium image SI and the template image TI with use of the usable pixels (S345 in FIG. 6). Accordingly, the positional relation between the partial medium image SI and the template image TI may be determined accurately.

For example, displacement may occur in local feature points depending on the algorithm to be used. Meanwhile, the edge pixels Egs, Egt may often form lines. Therefore, for determining the positional relation between the partial medium image SI and the template image TI based on the edge pixels Egs, Egt, the positional relation may be determined more accurately compared to a case, in which the positional relation is determined by use of the feature points alone.

The edge pixels Egs, Egt may include edge pixels forming noises. Meanwhile, when a form of an object, e.g., shoe SH, to be specified is complicated, a number of edge pixels Egs, Egt may increase excessively. Therefore, if the matching is conducted with use of all of the edge pixels Egs, Egt, the matching may tend to be conducted based on incorrect positions. In contrast, the edge pixels located in vicinity to the feature points in the image may likely be edge pixels related to parts that have local features, in other words, may not likely be the edge pixels that form noises. Moreover, with use of the edge pixels located in vicinity to the feature points alone, a number of edge pixels to be used may be restrained from increasing excessively. Accordingly, when the edge pixels located in vicinity to the feature points are used, negative influence by the noise may be suppressed more effectively than when all of the edge pixels in the image are used. Therefore, the positional relation between the partial medium image SI and the template image TI may be determined accurately.

Moreover, when the edge pixels located in vicinity to the feature points are used, a number of edge pixels to be used is smaller than when all of the edge pixels in the image are used. Therefore, time required to determine the positional relation between the partial medium image SI and the template image TI may be reduced.

Further, according to the present embodiment, the positional relation between the medium image Is and the template image TI may be determined (S320 in FIG. 6) in a first, relatively low, degree of accuracy. Thereafter, the CPU 310 may determine the positional relation between the medium image Is and the template image TI with use of the determined usable pixels in a second, relatively high, degree of accuracy (S345 in FIG. 6). Through the two-stepped position matching, the positional relation between the medium image Is and the template image TI may be determined in a faster speed compared to conducting a single matching process in the second degree of accuracy.

Further, according to the present embodiment, the positional relation may be determined in S320 in the first degree of accuracy with use of the minified medium image data, which is generated from the medium image data processed through the minifying process (S310 in FIG. 6), and the minified template image data, which is generated from the template image data processed through the minifying process (S300 in FIG. 6). Therefore, time required to determine the positional relation in the lower degree of accuracy may be reduced.

Moreover, according to the embodiment described above, the feature points Ps1-Ps11 in the medium image Is are specified within the partial medium image SI (see FIG. 5C), which is a part of the medium image Is corresponding to the template image TI, rather than within the entire medium image Is. Therefore, specifying feature points in the medium image Is that are useless may be restrained.

Further, according to the present embodiment, the matching in S345 in FIG. 6 in the higher degree of accuracy is a process using the ICP algorithm. Therefore, matching in the higher degree of accuracy using the effective edge pixels may be achieved.

B. Modified Examples

Examples modified from the embodiment described above will be described in the following paragraphs.

(1) In the embodiment described above, the medium image data representing the shoe SH is subject image data, in which the printable area is specified in the shoe SH. However, various data may be the subject image data, in which a predetermined area is specified. For example, in order to specify a marker representing a printable area on a sheet to print an image in the printable area on the sheet, scan data obtained by scanning a sheet may be used as the subject image data. For another example, in order to operate an industrial component through a robot, the industrial component may be determined in a captured image, and the captured-image data may be used as the subject image data.

(2) In the embodiment described above, the pattern matching in S320 in FIG. 6 is conducted using the minified medium image data and the minified template image data. However, optionally, the pattern matching in S320 in FIG. 6 may be conducted using the medium image data, not minified, and the template image data, not minified.

(3) In the embodiment described above, the steps in S335-S345 in FIG. 6 are conducted using the partial medium image data, which is a part of the medium image data. However, optionally, for example, when a difference in size between the medium image data and the template image data is small, the steps in S335-S345 in FIG. 6 may be conducted using the medium image data.

(4) In the embodiment described above, the CPU 310 conducts the two-stepped matching, which includes the pattern matching in S320 (see FIG. 6) and the ICP matching in S345 (see FIG. 6). However, optionally, the CPU 310 may conduct a single-stepped matching with use of the edge pixels located in vicinity to the feature points.

(5) In S455 and S460 in FIG. 7 in the embodiment described above, the edge pixels located within the predetermined distance from the valid feature points are determined to be the valid edge pixels located in vicinity to the valid feature points. However, optionally, the CPU 10 may divide the template image TI and the partial medium image SI into a plurality of blocks, and edge pixels located in blocks containing a predetermined number of (e.g., 1 to a few) feature points or more among the plurality of blocks may be determined as the valid edge pixels.

(6) In the embodiment described above, the matching in S320 in FIG. 6 uses pattern matching. However, optionally, matching with use of another algorithm, such as, for example, Chamfer Matching, may be conducted.

(7) In the embodiment described above, the matching in S345 in FIG. 6 uses the ICP algorithm. However, optionally, matching with use of another algorithm may be conducted.

(8) In the embodiment described above, the MSER algorithm is used to detect the feature points in S410, S415 in FIG. 7. However, optionally, the feature points may be detected with use of another algorithm, which may be, for example, a corner detection algorithm such as FAST and Harris.

(9) In the embodiment described above, the local feature amounts are described in S420, S425 in FIG. 7 with use of the BRISK algorithm. However, optionally, the local feature amounts may be described with use of another algorithm, which may be, for example, an algorithm using real vectors such as Scale-Invariant Feature Transform (SIFT) and Speeded-Up Robust Features (SURF), or, for another example, an algorithm using binary vectors such as Binary Robust Independent Elementary Features (BRIEF) and Fast Retina Keypoint (FREAK).

(10) The template registration process in FIG. 3A and the printing process in FIG. 3B may not necessarily be conducted in the terminal device 300 but may be partly or entirely conducted in different device(s). For example, the CPU 210 in the printer 200 or a CPU in the image-capturing device 400 may conduct the template registration process shown in FIG. 3A and the printing process shown in FIG. 3B. In these arrangements, the terminal device 300 may be omitted. For another example, a server connected with at least one of the printer 200, the terminal device 300, and the image-capturing device 400 through the Internet may conduct the template registration process shown in FIG. 3A and the printing process shown in FIG. 3B. In this arrangement, the server may be a so-called cloud server configured with a plurality of computers that may communicate with each other.

(11) For another example, a part of the configuration in the embodiment and the modified examples described above achieved through hardware may optionally be achieved through software, or a part or an entirety of the configuration in the embodiment and the modified examples described above achieved through software may optionally be achieved through hardware.

When some or all of the functions in the present disclosure is achievable through a computer program, the program may be provided in a form of being stored in a computer-readable storage medium, e.g., a non-transitory storage medium. The program may be, when being used, stored in the same storage medium as or a different storage medium (computer-readable storage medium) from the storage medium when it was provided. The computer-readable storage medium may not necessarily be limited to portable storage media such as a memory card and a CD-ROM but may include an internal memory device in a computer and an external memory device connected to a computer such as a hard disk drive.

Although examples of carrying out the invention have been described, those skilled in the art will appreciate that there are numerous variations and permutations of the computer-readable storage medium, the image processing apparatus, and the method for image processing that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

What is claimed is:

1. A non-transitory computer readable storage medium storing computer readable instructions that are executable by a computer, the computer readable instructions, when executed by the computer, causing the computer to:
    obtain first image data composing a first image and second image data composing a second image, the second image corresponding to an object;
    specify a plurality of first edge pixels in the first image with use of the first image data and a plurality of second edge pixels in the second image with use of the second image data;
    specify a first feature point and a second feature point corresponding to each other, the first feature point being a point located in a part of the first image having a predetermined local feature, the second feature point being a point located in a part of the second image having the predetermined local feature, the first feature point and the second feature point being specified with use of an algorithm different from an algorithm to specify the plurality of first edge pixels and the plurality of second pixels, correspondence between the first feature point and the second feature point being determined based on comparison between a first local feature amount indicating a feature of a local region including the first feature point and a second local feature amount indicating a feature of a local region including the second feature point;
    determine pixels located in vicinity to the first feature point among the plurality of first edge pixels as first usable pixels and determine pixels located in vicinity to the second feature point among the plurality of second edge pixels as second usable pixels;
    with use of the first usable pixels and the second usable pixels, determine positional relation between the first image and the second image;
    wherein the computer readable instructions, when executed by the computer, cause the computer to determine the positional relation between the first image and the second image in a predetermined degree of accuracy without using the first usable pixels or the second usable pixels, and
    wherein the computer readable instructions, when executed by the computer, cause the computer to determine the positional relation between the first image and the second image in the predetermined degree of accuracy earlier and determine the positional relation between the first image and the second image with use of the first usable pixels and the second usable pixels later in a higher degree of accuracy than the predetermined degree.

2. The computer readable storage medium according to claim 1,
    wherein the computer readable instructions, when executed by the computer, cause the computer to determine the positional relation between the first image and the second image in the predetermined degree of accuracy with use of minified first image data generated by minifying the first image data and minified second image data generated by minifying the second image data.

3. The computer readable storage medium according to claim 1,
    wherein the computer readable instructions, when executed by the computer, cause the computer to specify the first feature point in a partial image, the partial image being a part of the first image corresponding to the second image within the positional relation between the first image and the second image determined in the predetermined degree of accuracy.

4. The computer readable storage medium according to claim 1,
    wherein determining the positional relation between the first image and the second image in the predetermined degree of accuracy is a template matching process.

5. The computer readable storage medium according to claim 1,
    wherein the computer readable instructions, when executed by the computer, cause the computer to use Iterative Closest Point algorithm in determining the positional relation between the first image and the second image with use of the first usable pixels and the second usable pixels in the higher degree of accuracy.

6. The computer readable storage medium according to claim 1,
    wherein the computer readable instructions, when executed by the computer, cause the computer to use Maximally Stable Extremal Regions algorithm in determining the first feature point and the second feature point.

7. An image processing apparatus, comprising:
a memory configured to store data, and
a controller configured to:
  obtain first image data composing a first image and second image data composing a second image, the second image corresponding to an object;
  specify a plurality of first edge pixels in the first image with use of the first image data and a plurality of second edge pixels in the second image with use of the second image data;
  specify a first feature point and a second feature point corresponding to each other, the first feature point being a point located in a part of the first image having a predetermined local feature, the second feature point being a point located in a part of the second image having the predetermined local feature, the first feature point and the second feature point being specified with use of an algorithm different from an algorithm to specify the plurality of first edge pixels and the plurality of second pixels, correspondence between the first feature point and the second feature point being determined based on comparison between a first local feature amount indicating a feature of a local region including the first feature point and a second local feature amount indicating a feature of a local region including the second feature point;
  determine pixels located in vicinity to the first feature point among the plurality of first edge pixels as first usable pixels and determine pixels located in vicinity to the second feature point among the plurality of second edge pixels as second usable pixels;
with use of the first usable pixels and the second usable pixels, determine positional relation between the first image and the second image,
determine the positional relation between the first image and the second image in a predetermined degree of accuracy without using the first usable pixels or the second usable pixels, and
determine the positional relation between the first image and the second image in the predetermined degree of accuracy earlier and determine the positional relation between the first image and the second image with use of the first usable pixels and the second usable pixels later in a higher degree of accuracy than the predetermined degree.

8. A method to process images, comprising:
obtaining first image data composing a first image and second image data composing a second image, the second image corresponding to an object;
specifying a plurality of first edge pixels in the first image with use of the first image data and a plurality of second edge pixels in the second image with use of the second image data;
specifying a first feature point and a second feature point corresponding to each other, the first feature point being a point located in a part of the first image having a predetermined local feature, the second feature point being a point located in a part of the second image having the predetermined local feature, the first feature point and the second feature point being specified with use of an algorithm different from an algorithm to specify the plurality of first edge pixels and the plurality of second pixels, correspondence between the first feature point and the second feature point being determined based on comparison between a first local feature amount indicating a feature of a local region including the first feature point and a second local feature amount indicating a feature of a local region including the second feature point;
determining pixels located in vicinity to the first feature point among the plurality of first edge pixels as first usable pixels and determine pixels located in vicinity to the second feature point among the plurality of second edge pixels as second usable pixels;
with use of the first usable pixels and the second usable pixels, determining positional relation between the first image and the second image;
determining the positional relation between the first image and the second image in a predetermined degree of accuracy without using the first usable pixels or the second usable pixels, and
determining the positional relation between the first image and the second image in the predetermined degree of accuracy earlier and determine the positional relation between the first image and the second image with use of the first usable pixels and the second usable pixels later in a higher degree of accuracy than the predetermined degree.

* * * * *